US012621201B1

(12) United States Patent
Powers et al.

(10) Patent No.: US 12,621,201 B1
(45) Date of Patent: May 5, 2026

(54) ALERT REDUCTION USING MACHINE LEARNING SCORING

(71) Applicant: International Business Machines Corporation, Armonk, NY (US)

(72) Inventors: Joshua J. Powers, Round Hill, VA (US); Christopher A. Kulakowski, Austin, TX (US); Sophia Izokun, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 99 days.

(21) Appl. No.: 18/914,493

(22) Filed: Oct. 14, 2024

(51) Int. Cl.
| | |
|---|---|
| *G06F 21/50* | (2013.01) |
| *H04L 41/0604* | (2022.01) |
| *H04L 41/16* | (2022.01) |

(52) U.S. Cl.
CPC .......... *H04L 41/0627* (2013.01); *G06F 21/50* (2013.01); *H04L 41/16* (2013.01)

(58) Field of Classification Search
CPC ........ G06F 21/32; G06F 21/316; G06F 21/35; G06F 21/43; G06F 21/606; G06F 21/6245; G06F 16/93; G06F 16/9535; G06F 40/263; G06F 11/3438; G06F 16/24528; G06F 16/2462; G06F 16/335; G06F 16/353; G06F 16/367; G06F 16/90335; G06F 16/904; G06F 17/18; G06F 18/15; G06F 18/2431; G06F 21/44; G06F 21/552; G06F 21/554; G06F 21/629; G06F 2111/10;
(Continued)

(56) References Cited

U.S. PATENT DOCUMENTS

| | | | | |
|---|---|---|---|---|
| 10,474,966 | B2 * | 11/2019 | Israel | ..................... G06N 20/00 |
| 11,171,970 | B2 * | 11/2021 | Gamble | ............... G06F 16/907 |

(Continued)

FOREIGN PATENT DOCUMENTS

| | | |
|---|---|---|
| CN | 106790256 A | 5/2017 |

OTHER PUBLICATIONS

Anant et al., "Fine-tuning Cloud SIEM detections through machine learning," Sumo Logic, May 4, 2023, 39 pages, sumologic.com, accessed Jul. 31, 2024, https://www.sumologic.com/blog/tuning-cloud-siem-machine-learning/.
(Continued)

*Primary Examiner* — Daniel Previl
(74) *Attorney, Agent, or Firm* — Yee & Associates, P.C.

(57) ABSTRACT

Reducing false positive computer security alerts is provided. A dataset is ingested that comprises a number of security alerts with resolution status. The alerts comprise data fields which are then tokenized. Cardinality is calculated for each tokenized data field compared against the whole dataset. Entropy is calculated for each tokenized value. A combined token score is generated for each tokenized field based on cardinality and entropy. Each combined token score is compared against all tokenized fields for the alerts. Each combined token score is adjusted based on the comparison. Any tokens resolved as true positives are excluded. A generative language model generates an exclusion condition based on the adjusted token scores. The exclusion condition is run against a second dataset to generate a score. The exclusion condition and its score are presented to a user. Responsive to user acceptance, the exclusion condition is deployed to filter false positive alerts.

20 Claims, 9 Drawing Sheets

(58) Field of Classification Search

CPC ............. G06F 2221/2113; G06F 30/20; G06F 40/253; G06F 40/268; G06F 1/00; G06F 3/00; G06F 5/00; G06F 7/00; G06F 8/00; H04L 63/0861; H04L 9/3231; H04L 9/0866; H04L 63/083; H04L 9/008; H04L 2463/082; H04L 63/08; H04L 63/0876; H04L 63/102; H04L 63/1416; H04L 9/0825; H04L 9/0894; H04L 9/3213; H04L 9/3247; H04L 2209/60; H04L 2209/88; H04L 2463/061; H04L 2463/062; H04L 41/0631; H04L 41/0886; H04L 41/12; H04L 41/142; H04L 41/22; H04L 41/40; H04L 47/762; H04L 63/0428; H04L 63/0442; H04L 63/0807; H04L 63/10; H04L 63/105; H04L 63/1425; H04L 63/1433; H04L 63/1441; H04L 63/1491; H04L 63/166; H04L 63/20; H04L 63/205; H04L 9/0838; H04L 9/0852; H04L 9/0863; H04L 9/3263; H04L 9/3297; H04L 9/50; G06V 40/70; G06V 40/20; G06V 40/1365; G06V 40/15; G06V 40/172; G06V 40/197; G06V 10/70; G06V 40/16; G16H 40/63; G16H 50/20; G16H 15/00; G16H 40/67; G16H 50/70; G16H 10/20; G16H 30/40; G16H 50/30; G16H 20/30; G16H 20/60; G16H 20/70; G16H 30/20; A61B 5/0077; A61B 5/11; A61B 5/117; A61B 5/4818; A61B 7/003; A61B 5/112; A61B 5/1176; A61B 5/7264; A61B 2503/22; A61B 2562/0204; A61B 2562/0219; A61B 5/01; A61B 5/0205; A61B 5/1101; A61B 5/1123; A61B 5/1172; A61B 5/4266; A61B 5/486; A61B 5/6893; A61B 5/6898; A61B 5/7203; A61B 5/7267; A61B 5/746; A61B 7/00; G06N 20/00; G06N 5/01; G06N 5/02; G06N 5/04; G10L 15/26; G10L 17/00; G10L 17/26; G10L 17/04; G10L 17/22; H04W 12/66; H04W 12/06; H04W 12/068; H04W 12/65; H04W 12/68; H04W 12/71; Y10S 707/99933; G06Q 10/10; G06Q 10/101; G06Q 10/40; G06Q 20/341; G06Q 20/4014; G06Q 20/40145; G06Q 20/4016; G06Q 2220/12; G06Q 2230/00; G06Q 30/0201; G06Q 30/0241; G06Q 30/0279; G06Q 40/06; G06Q 50/18; G06Q 50/184; G06Q 50/20; G07C 13/00; G07F 7/1008; G07F 7/1041; G07F 7/1083; G08B 21/06; G08B 21/182

USPC ....... 340/506, 507, 509, 516, 517, 534–535, 340/576, 641, 661, 679, 683, 693.2, 3.43, 340/3.44, 825.22, 7.49, 7.59

See application file for complete search history.

(56) References Cited

U.S. PATENT DOCUMENTS

| | | | |
|---|---|---|---|
| 11,620,389 B2 | 4/2023 | Karabatis et al. | |
| 2016/0188676 A1* | 6/2016 | Barker ................. | H04L 47/762 |
| | | | 707/770 |
| 2017/0171231 A1* | 6/2017 | Reybok, Jr. ............ | H04L 63/14 |
| 2022/0092165 A1* | 3/2022 | Keith, Jr. .............. | G06F 21/316 |
| 2022/0139546 A1* | 5/2022 | Manjunath ........... | H04L 9/3231 |
| | | | 705/2 |
| 2022/0164424 A1* | 5/2022 | Keith, Jr. ............. | H04L 9/0866 |
| 2023/0316284 A1 | 10/2023 | Kramme et al. | |
| 2024/0146746 A1* | 5/2024 | Bhatia ................ | H04L 63/1416 |

OTHER PUBLICATIONS

Mathur, "The Adaptive Security Engine—A Quantum Leap Forward for Application and API Protection," Akamai, Jun. 14, 2021, 8 pages, akamai.com, accessed Jul. 31, 2024, https://www.akamai.com/blog/security/the-adaptive-security-engine-a-quantum-leap-forward-for-application.

Mozalbat, "Reducing False-Positive Alerts in SIEM Systems Using TF-IDF," Eindhoven University of Technology, Oct. 29, 2020, 21 pages, tue.nl, accessed Jul. 31, 2024, https://research.tue.nl/en/studentTheses/reducing-false-positive-alerts-in-siem-systems-using-tf-idf.

Pietraszek et al., "Data Mining and Machine Learning—Towards Reducing False Positives in Intrusion Detection," Information Security Technical Report, 2005, pp. 1-17, vol. 10, Issue 3, sciencedirect.com, accessed Jul. 31, 2024, https://www.sciencedirect.com/science/article/abs/pii/S1363412705000361.

Pipkin, "Insight Generation Process," Sumo Logic, Apr. 19, 2024, 11 pages, help.sumologic.com, accessed Jul. 31, 2024, https://help.sumologic.com/docs/cse/get-started-with-cloud-siem/insight-generation-process/#redundant-signal-suppression.

Stroeh et al., "An approach to the correlation of security events based on machine learning techniques," Journal of Internet Services and Applications, Mar. 11, 2013, pp. 1-16, vol. 4, springeropen.com, accessed Jul. 31, 2024, https://jisajournal.springeropen.com/articles/10.1186/1869-0238-4-7.

* cited by examiner

COMPUTING ENVIRONMENT
100

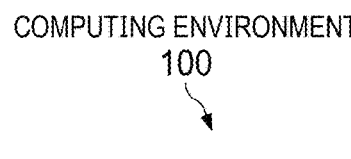

FIG. 1

COMPUTER　　101

PROCESSOR SET　　110

120 — PROCESSING CIRCUITRY

CACHE — 121

111 — COMMUNICATION FABRIC

112 — VOLATILE MEMORY

PERSISTENT STORAGE　　113

122 — OPERATING SYSTEM

ALERT FILTER SYSTEM — 180

PERIPHERAL DEVICE SET　　114

123 — UI DEVICE SET

124 — STORAGE

IoT SENSOR SET — 125

NETWORK MODULE　　115

103

END USER DEVICE

PRIVATE CLOUD

106

WAN
102

REMOTE SERVER

REMOTE DATABASE

130

104

GATEWAY　　140

PUBLIC CLOUD　　105

141 — CLOUD ORCHESTRATION MODULE

HOST PHYSICAL MACHINE SET — 142

143 — VIRTUAL MACHINE SET

CONTAINER SET — 144

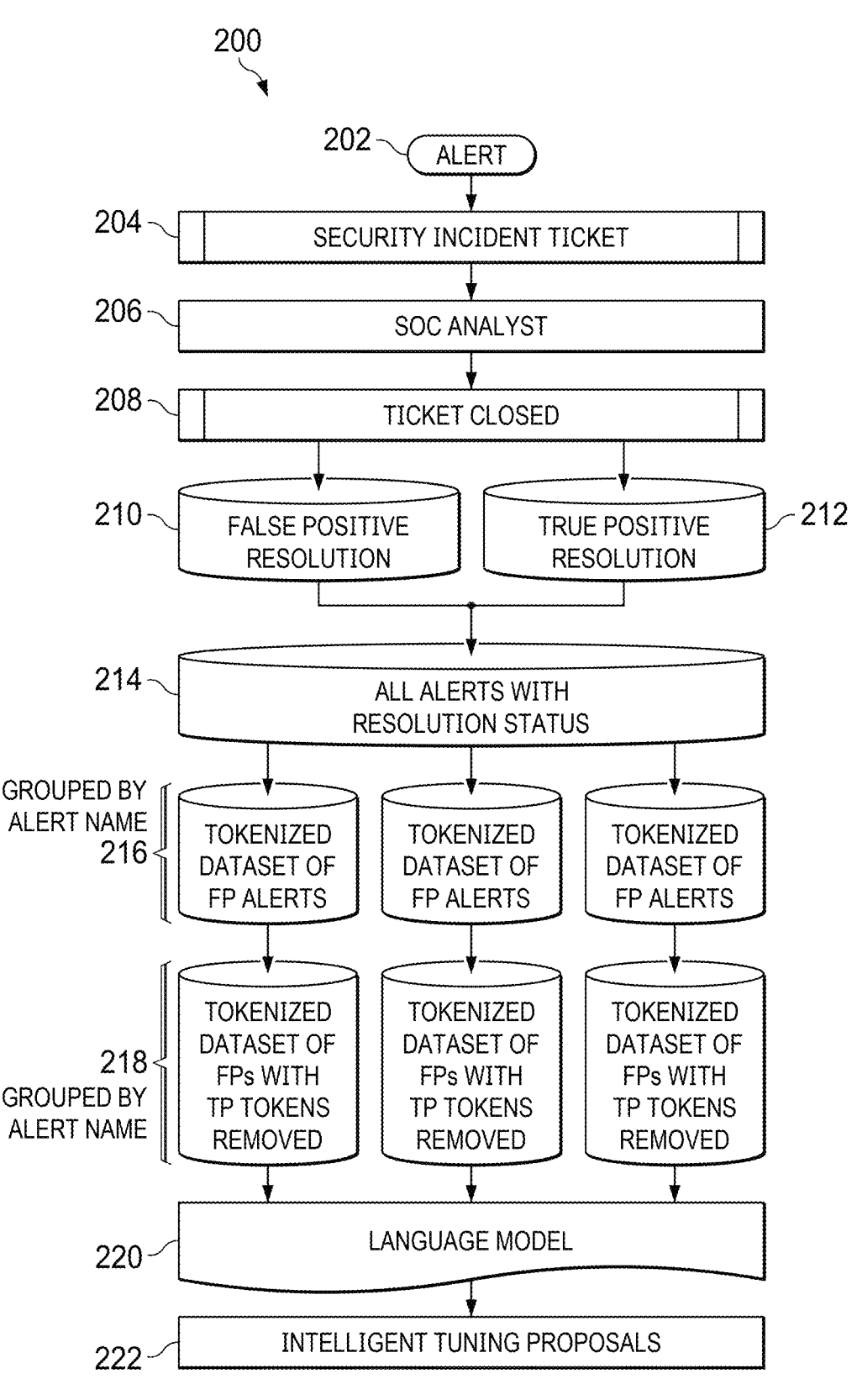

200

202 — ALERT

204 — SECURITY INCIDENT TICKET

206 — SOC ANALYST

208 — TICKET CLOSED

210 — FALSE POSITIVE RESOLUTION

TRUE POSITIVE RESOLUTION — 212

214 — ALL ALERTS WITH RESOLUTION STATUS

GROUPED BY ALERT NAME 216

TOKENIZED DATASET OF FP ALERTS

TOKENIZED DATASET OF FP ALERTS

TOKENIZED DATASET OF FP ALERTS

218
GROUPED BY ALERT NAME

TOKENIZED DATASET OF FPs WITH TP TOKENS REMOVED

TOKENIZED DATASET OF FPs WITH TP TOKENS REMOVED

TOKENIZED DATASET OF FPs WITH TP TOKENS REMOVED

220 — LANGUAGE MODEL

222 — INTELLIGENT TUNING PROPOSALS

FIG. 2

| SCORE | PROPOSAL CONFIDENCE | FP RATE | COUNT OF UNIQUE HOSTNAMES |
|---|---|---|---|
| 0-25 | LOW | HIGH | HIGH |
| 25-50 | MEDIUM | MEDIUM | HIGH |
| 50-75 | MEDIUM | SMALL | MEDIUM |
| 75-100 | HIGH | SMALL | LOW |

FIG. 5

| FILENAME | PARENT PROCESSES | CHILD PROCESSES | EXPECTED PATHS | DESCRIPTION |
|---|---|---|---|---|
| colorcpl.exe | rundll32.exe<br>chrome.exe<br>runtimebroker.exe<br>outlook.exe<br>exlporer.exe | NA | C:\\Windows\\System32<br><br>C:\\Windows\\SysWOW64 | MICROSOFT COLOR CONTROL PANEL |

FIG. 6

| CLOSED STATUS | HOSTNAME | FileName |
|---|---|---|
| TP | Cyberdineserv0001 | Classified_ProjectX.exe |
| FP | Cyberdineserv004 | Aurora_task.bin |
| FP | Cyberdinework56 | Aurora_task.bin |
| FP | Cyberdineserv0001 | Aurora_task1.exe |
| FP | Cyberdineserv2 | Aurora_task.exe |

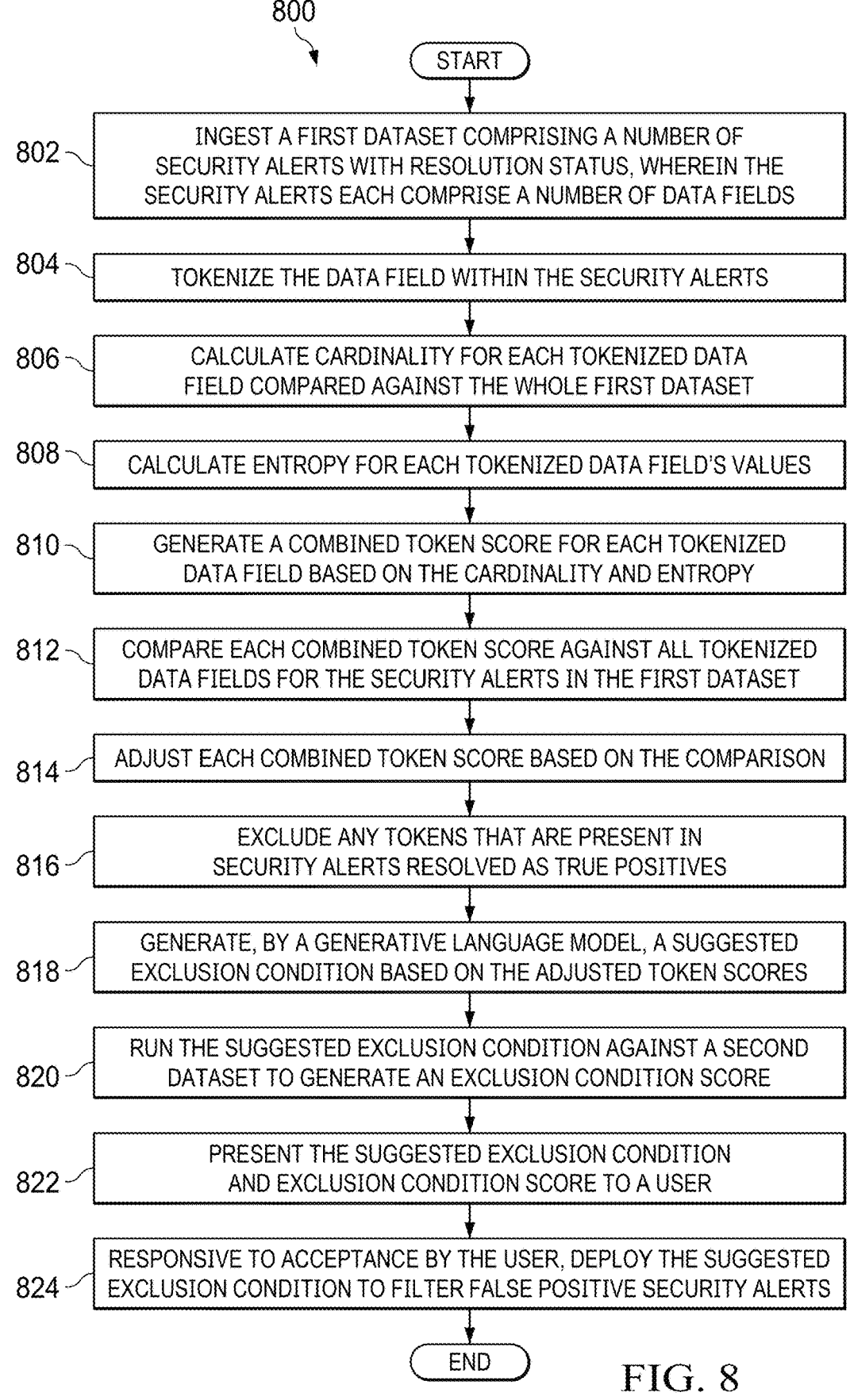

START

802 — INGEST A FIRST DATASET COMPRISING A NUMBER OF SECURITY ALERTS WITH RESOLUTION STATUS, WHEREIN THE SECURITY ALERTS EACH COMPRISE A NUMBER OF DATA FIELDS

804 — TOKENIZE THE DATA FIELD WITHIN THE SECURITY ALERTS

806 — CALCULATE CARDINALITY FOR EACH TOKENIZED DATA FIELD COMPARED AGAINST THE WHOLE FIRST DATASET

808 — CALCULATE ENTROPY FOR EACH TOKENIZED DATA FIELD'S VALUES

810 — GENERATE A COMBINED TOKEN SCORE FOR EACH TOKENIZED DATA FIELD BASED ON THE CARDINALITY AND ENTROPY

812 — COMPARE EACH COMBINED TOKEN SCORE AGAINST ALL TOKENIZED DATA FIELDS FOR THE SECURITY ALERTS IN THE FIRST DATASET

814 — ADJUST EACH COMBINED TOKEN SCORE BASED ON THE COMPARISON

816 — EXCLUDE ANY TOKENS THAT ARE PRESENT IN SECURITY ALERTS RESOLVED AS TRUE POSITIVES

818 — GENERATE, BY A GENERATIVE LANGUAGE MODEL, A SUGGESTED EXCLUSION CONDITION BASED ON THE ADJUSTED TOKEN SCORES

820 — RUN THE SUGGESTED EXCLUSION CONDITION AGAINST A SECOND DATASET TO GENERATE AN EXCLUSION CONDITION SCORE

822 — PRESENT THE SUGGESTED EXCLUSION CONDITION AND EXCLUSION CONDITION SCORE TO A USER

824 — RESPONSIVE TO ACCEPTANCE BY THE USER, DEPLOY THE SUGGESTED EXCLUSION CONDITION TO FILTER FALSE POSITIVE SECURITY ALERTS

END

FIG. 8

ALERT REDUCTION USING MACHINE LEARNING SCORING

BACKGROUND

The disclosure relates generally to computer security alerts, and more specifically to reducing security alert false positives.

Security Operation Center (SOC) personnel triage and investigate alerts, working through their process to eventually change the status of the alert to an end state. One such classification of the status of the alert is False Positive (FP). A False Positive is an indicator that an alert is non-malicious and does not require remediation steps. Such FPs take analysts' time away from other alerts that could be more serious. SOC teams often have a high number of FPs in large organizations, and more time is spent on tuning.

Tuning is the process of excluding conditions that are deemed non-malicious wherein the organization accepts the risk that no alert or investigation is necessary when these conditions exist. The tuning effort reduces the FP rate and allows the SOC to spend more time focusing on high fidelity alerts that could require remediation actions to protect the organization or business. The process of tuning requires multiple steps such as finding alerts that are classified as FP grouped by the alert name, gathering all the alert data, looking for commonalities within the data, devising a proposed condition for which the business would accept the risk, etc.

At the end of an incident response life cycle is a post-review phase in which everything that occurred during the incident is reviewed for any gaps or improvements that could be made to reduce the risk to the organization. During this post-review phase, alerts are sometimes classified as FP and further analyzed for potential tuning opportunities.

SUMMARY

An illustrative embodiment provides a computer-implemented method of reducing false positive computer security alerts. The method comprises ingesting a first dataset comprising a number of security alerts with resolution status, wherein the security alerts each comprise a number of data fields which are then tokenized. Cardinality is calculated for each tokenized data field compared against the whole first dataset. Entropy is calculated for each tokenized data field's values. A combined token score is generated for each tokenized data field based on the cardinality and entropy. Each combined token score is compared against all tokenized data fields for the security alerts in the first dataset. Each combined token score is then adjusted based on the comparison. Any tokens that are present in security alerts resolved as true positives are excluded. A generative language model generates a suggested exclusion condition based on the adjusted token scores. The suggested exclusion condition is run against a second dataset to generate an exclusion condition score. The suggested exclusion condition and exclusion condition score are presented to a user. Responsive to acceptance by the user, the suggested exclusion condition is deployed to filter false positive security alerts. According to other illustrative embodiments, a computer system and a computer program product for reducing false positive computer security alerts is provided.

BRIEF DESCRIPTION OF THE DRAWINGS

FIG. 1 is a block diagram of a computing environment in accordance with an illustrative embodiment;

FIG. 2 depicts a block diagram illustrating an overview of a SOC process in accordance with an illustrative embodiment;

FIG. 5 depicts a table of tuning proposal scores in accordance with an illustrative embodiment;

FIG. 6 depicts a table illustrating an analysis of an alert with crowd sourced input in accordance with an illustrative embodiment;

FIG. 7 depicts a table of example resolved security incident tickets to which the illustrative embodiments can be applied;

FIG. 8 depicts a flowchart illustrating a process for reducing false positive computer security alerts in accordance with an illustrative embodiment;

DETAILED DESCRIPTION

Figure 3:
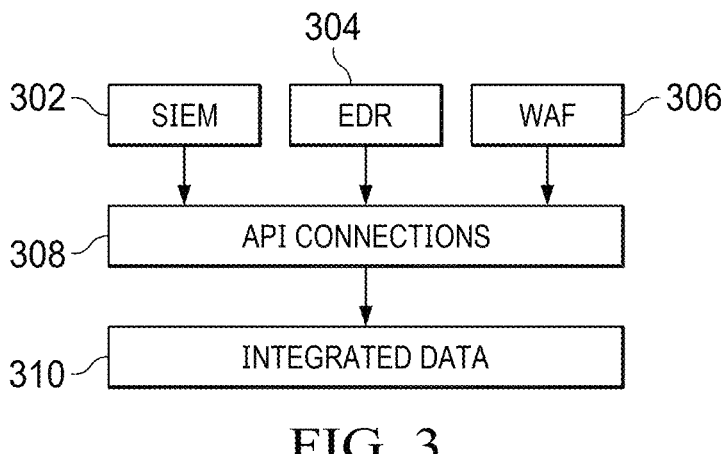
FIG. 3 depicts a block diagram illustrating data integration in accordance with an illustrative embodiment.

The illustrative embodiments recognize and take into account that tuning to screen out false positives comprises a life cycle of identification, analysis, monitoring, and deployment.

Identification involves marking one or more false positive (FP) alerts as potential tuning candidate. The tuning candidates are then sent to the backlog and assigned a resource once available to work on the analysis phase.

During the analysis phase the assigned resource analyzes the rule logic, the incident details, and the rule context or the intention of the rule. This is important as the rule logic was made to identify suspicious activity but, the rule logic occasionally does not match the context. After analyzing the logic, details and context the resource develops tuning recommendation. The tuning recommendation either modifies the original rule logic by changing conditions or adds exclusions when the original logic matches.

During monitoring the tuning logic is applied as a separate rule and monitored for a defined time, or a historical search is performed. The goal of monitoring is to capture all the true positive (TP) matches while excluding all the FP incidents found during the analysis phase. TP and FP numbers are then tallied, and a TP/FP ratio is defined.

Using the TP/FP ratio, either the tuning proposal is presented to additional members for approval and deployment, or the current rule is modified immediately with the changes identified as the tuning proposal.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 shows a pictorial representation of a computing environment in which illustrative embodiments may be implemented. Computing environment 100 contains an example of an environment for the execution of at least some of the computer code involved in performing the inventive methods, such alert filter system 180.

In addition to alert filter system 180, computing environment 100 includes, for example, computer 101, wide area network (WAN) 102; end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and alert filter system 180, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in alert filter system 180 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in alert filter system 180 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICRO-SERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to a "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

The illustrative embodiments can be implemented as a Software as a Service model (SaaS) or using an existing infrastructure. The flexibility of deployment allows an organization to utilize the best option for their needs. API connectors can be leveraged to get data from various systems like SIEM (Security Information and Event Management) or EDR (Endpoint Detection and Response). This connection method allows the organization to add as many systems as needed through the API connector.

Any team like a SOC will benefit from this solution as it will save time at multiple tedious steps. Mentioned in the background statement, the tuning process requires manual effort from a team member(s) to provide a proposed solution. Instead requiring manual effort from a team member(s) to provide a proposed solution, the illustrative embodiments provide a tuning suggestion to the analyst to review before submission to a change control board. The analyst will have confidence in knowing, based on historical data, the TP/FP ratio and the overall impact the proposed tuning solution will have. This data is key for a change control board understanding the risk in introducing the proposed tune.

FIG. 2 depicts a block diagram illustrating an overview of a SOC process in accordance with an illustrative embodiment. Process 200 is an example implementation of alert filter system 180 in FIG. 1.

Process 200 begins with an alert generation 202 when an incident is detected or reported, which results in the generation of a security incident ticket 204 in which the alert is logged a security incident. A SOC analyst 206 works the security incident ticket 204, including assessment, triages, and investigation. After investigation, the ticket is closed 208, and the resolution status is updated.

After resolution of the ticket, the alert is classified as a false positive resolution 210 or a true positive resolution 212 and entered in a repository of all alerts with resolution status 214.

The illustrative embodiments employ machine learning to reduce FP alerts and reduce the amount of time and effort necessary to provide a tuning suggestion. FP alerts are grouped by name and platform. These alerts contain all necessary fields and values for the evaluation process. Each of the data values is counted and broken down into its core points to extract patterns. This process is performed by tokenization, wherein each token is analyzed for cardinality and entropy, producing datasets 216 of FP alerts grouped by name. The metrics obtained for each token identify how unique the token is and how random the value is compared to the dataset. Tokens present in security alerts that were previously resolved as true positives are removed, resulting in datasets 218.

An autonomous model 220 uses the cardinality and entropy metrics from the tokens to determine what key values or strings are unique enough to use a case (rule) exception. As an example, if a group of alerts has the same hostname IE, that hostname has a repeated value in the grouping. The cardinality of the hostname will be low, which indicates the hostname field is a confident method to use in an exclusion condition. As another example, the process name "svchost.exe" is a Windows native system32 executive. After tokenization occurs, there may be a token for "svchost.exe" with a low cardinality value for a group of alerts. However, comparing this token to the entire dataset of alerts it can be seen that "svchost.exe" is also a token in other alert groupings. This indicates that it is not a candidate alone and will not be proposed in the rule exception.

Each token identified has a score associated to it than can be used by an end user. The user can drive the selection of the rule exception using, for example, a user interface (UI) slider that allows adjusting the condition from "loose" at end of the slider to "tight" on the other end (see FIG. 4).

The language model 220 produces intelligent tuning proposals 222. Each condition that is calculated is provided a total score by taking 1 or more field pairings based on the alert name. This score is then provided to the SOC for further evaluation of the proposed tuning conditions. For FP alerts, the tuning proposal has a score of X which would apply to reducing Y number of alerts. For TP alerts, the tuning proposal is compared against the TP alerts to determine how many would be missed if the tune was implemented. Historical data is used to provide risk score.

The data ingestion stage is broken down into multiple steps to create a pipeline that pulls data in and gets it ready for the next stages of processing. The steps in this pipeline will involve collecting, importing, and cleaning the data. The goal of Data Source Identification is to identify and locate data sources that have security alerts coming in with resolution status. Examples include SIEM systems (Security Information and Event Management), EDR (Endpoint Detection and Response) Systems, WAF (Web Application Firewall), MDR (Managed Detection and Response), and ITSM (IT Service Management).

In the context of alerts and ITSM, some alerts can trigger the creation of incident tickets, and this can be based on things like severity (as determined by the original source of the alerts) or it can be based on a set of pre-determined rules depending on what security risks on which an organization has decided to focus. This means that regardless of the alert source, as long as an alert has a certain severity level or meets certain conditions, a ticket will be created, and alert data can be found from all sources in one location which is the ITSM.

After identifying the sources, the next step in the data ingestion pipeline is to gather the alert data from said sources. There are several ways to achieve this but most common and most efficient is with the use of an API (application programming interface). Using an API as a data collection source allows for easy scaling and integration with the rest of the Machine Learning pipeline. Most vendors offer REST API or GraphQL access and the built-in ability to integrate with one another.

FIG. 3 depicts a block diagram illustrating data integration in accordance with an illustrative embodiment. Since the alert data comes from multiple sources (e.g., SEIM 302, EDR 304, WAF 306), this step involves integrating them into an integrated dataset 310. This step can extract and combine data from the sources 302-306 while simultaneously filtering, extracting only the needed fields/data. It can also pull and integrate the relevant data from all sources and perform the filtering at the data cleaning or pre-processing step. Leveraging the API 308 for this step involves writing scripts or creating data flow diagrams to direct the alert data from their source into a centralized storage location. The needed fields are determined according to what type of data is used in subsequent steps. Users can pick and choose what fields to use before the data integration stage. For example, for scoring and validation, when the intent is to identify unique entities affected, a field such as "hosts_affected" or "number_of_users" would be needed. More general fields used in data processing, data science and analysis work include "timestamp," "alert id" (the unique identifier for each alert helps in tracking and managing individual alerts throughout their life cycle), and "platform" (source of the alert).

For organizations that push all their alert data to their SIEM system, ITSM system or a logging solution, this step becomes more simplified since there is just one source to from which to pull.

After data integration, data cleaning and pre-processing prepares the dataset for the Tokenization stage. It involves handling missing data within the integrated dataset, removing whitespace, normalizing the text by changing to lowercase, determining what would count as stop words within alerts data and removing those as well.

After data ingestion, the process proceeds to tokenization and data processing. The alert data consumed in the previous step is processed to apply data science techniques such as cardinality, entropy, and a confidence score to each proposed exclusion condition. The first step involves tokenization of the data which is typically done by using non-alphanumeric characters as delimiters but optionally could be done by new line, return carriages, and separators in key/value pairs.

An example using the 'split( )' python function is:

```
text="Hello, my name is John Doe"
tokens=text.split( )
print(tokens)
Output:
['Hello,', 'my', 'name', 'is', 'John', 'Doe']
```

Once the input data is tokenized, the cardinality is calculated for each field+token compared against the dataset. Using the python example above, the process would check to see how unique the field "text" and the token "Hello" is to the rest of the dataset. If it is unique to the grouping of alerts described above, then the process increases the score for the field+token combination by 1 (1 is arbitrary, another value can be used).

Next, the process calculates the entropy of each field's values, which indicates how random or not random the values are within the alert grouping. For example, if the field of a given alert "ip_address" has a high entropy then the values are more diverse and therefore not good for using in tuning. If the entropy is low, then it is likely a good candidate for use in tuning. The process therefore increases the score once again by 1.

The scores calculated during this processing step are paired with each field+token. Using the python code example above after processing produces a JSON (JavaScript Object Notation) object like:

```
{
    "field": "text",
    "value": "Hello",
    "score": 1
}
```

The next step in this process involves the systematic evaluation of the processed and scored tokens generated in the prior step. The process thus far has only analyzed the dataset for a specific grouping of alerts. The training/learning component leverages the entire dataset to further evaluate how the tokens compare to other alerts, especially alerts that have been resolved as True Positive. This comparison ensures the process does not propose a tuning suggestion that inadvertently blinds the organization to actual threats.

For each field+token+score generated above there is a comparison to a dataset of field+token for all alerts in the platforms. This comparison obtains metrics to determine the likelihood that a "tuning token" is observed in an alert that was resolved as a True Positive. Any tokens identified in the dataset that are seen in alerts with resolution of "True Positive" should be excluded from the tuning proposal. This processing step is continuous and ensures that the trained dataset of "tuning tokens" only comprises tokens that will not decrease organization visibility of true threats.

The scores of each token are increased or decreased based on the comparison with the larger dataset of alerts. After training, a token which is found to be unique not just to the alert grouping but also unique to all other alerts in the larger dataset will have the score increased by 1 (or whatever scoring scale is used). This processing en masse of all the identified tokens results in a curated or "trained" dataset of potential key/value pairs that are fed into the next step which uses generative language models to produce the tuning "proposal".

Example of a token after processing with a high score:
```
{
   "field": "path",
   "value": "/hello/team/specificproject/specificname.sh",
   "score": 19
}
```
Example of a token after processing with a low score:
```
{
   "field": "path",
   "value": "C:\\Windows\\System32\\svchost.exe",
   "score": 1
}
```

Generating the tuning proposal leverages a generative language model that has been trained on query languages used by today's enterprise SIEM and EDR technologies. For example, the model may be trained on Splunk, AQL, SQL, Kusto, EQL, Sigma, KQL, and DSL.

The data curated in prior steps is ingested into this model to produce an output that resembles an exclusion condition that will eliminate or reduce the number of false positive alerts resolved by security analysts. The score of each token is used to suggest what conditions are used. The highest scoring tokens are suggested first. There is also a component to configure the length and complexity of the suggestion.

Figure 4:
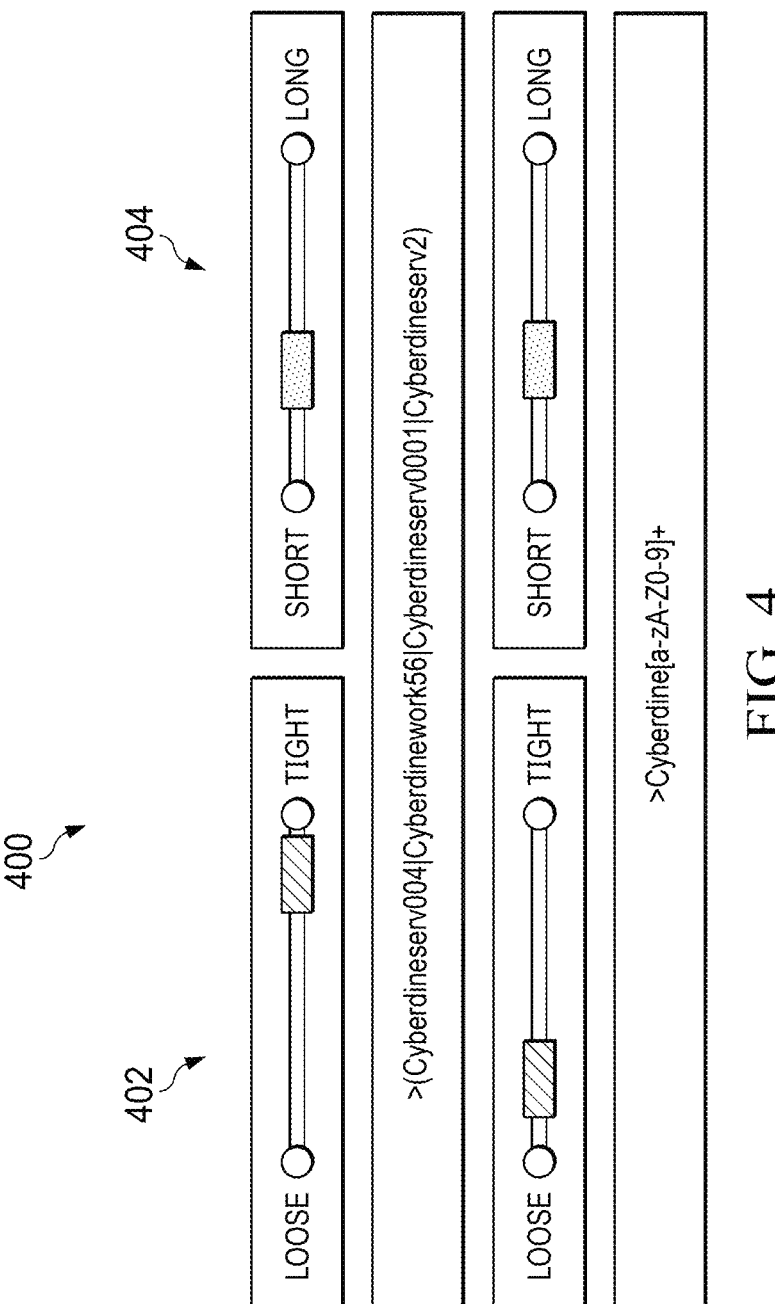
FIG. 4 depicts an example of a user interface sliding mechanism to adjust length and complexity of tuning proposals in accordance with an illustrative embodiment.

FIG. 4 depicts an example of a user interface sliding mechanism to adjust length and complexity of tuning proposals in accordance with an illustrative embodiment. The UI sliding mechanism 400 comprises a first slider 402 that can be adjusted by a user to make the exclusion "loose" (less complex) or "tight" (more complex). Slider 404 allows the user to control the length of the exclusion. For example, an exclusion that contains 100 lines of code might be too difficult to manage and could reach limitations within the technology to implement. Therefore, UI sliding mechanism provides the user has the ability to select a length/depth in the output as well as a scope.

Incorporating a regular expression generator such as IBM's Watson X or https://regex.ai/can be used for more complex tuning as this is more scalable and efficient than excluding 10 host names by the full string.

Crowd sourced inputs can be incorporated as part of the final score. For example, EchoTrail Insights is an example of a crowd sourced tool that contains profiles of process executions. This tool has insights that could help SOC Analysts by providing detailed analytics on process behavior and parent/child process relationships. These insights are community provided, meaning information is provided from other users in the security operations community. Incorporating data and information from a tool like EchoTrail Insights will enhance the level of confidence in final scoring and verification metrics.

The final step takes the intelligent tuning proposal and runs the suggestion against a dataset to produce a score. This dataset can either be a listing of past events based on the data ingestion detailed above and/or a real-time lookup with the security platform. Using the output of the events (in either case or both) metrics are established based on the results.

Impact assessment calculates the total number of events in the dataset that would match the tuning proposal. It also provides a distinct count of values within fields to identify unique entities affected. Ex: number of hosts affected, number of users, etc.

Tallying the True Positive (TP)/False Positive (FP) ratios is based on the total number of events and is identified by the past associations using the alert status within the security platform and/or status listed by the ticketing system used for the investigations. This count also includes the distinct count of TP/FP events from the key fields to identify unique entities affected (e.g., number of hosts).

FIG. 5 depicts a table of tuning proposal scores in accordance with an illustrative embodiment. A combined score is calculated from the impact assessment and TP/FP values. A higher score indicates a lower FP rate and low number of distinct key values. A lower score indicates higher FP rate and high number of distinct key values.

The confidence of the suggested score can be improved by including input from crowd sourced tools such as EchoTrail. FIG. 6 depicts a table illustrating an analysis of an alert with crowd sourced input in accordance with an illustrative embodiment.

In the present example, an alert comes that has the Filename "colorcpl.exe" associated with it. Using the Echo-Trail API and search for the filename reveals the behavioral and ancestry analysis such as hash, expected path, expected parent/child process, etc.

If the clustered alerts processed from this method have a file name token of "colorcpl.exe", and the final tuning proposal suggests using the filename value as an anchor, the additional context from crowd sourced data can help to determine whether what is being tune is also known benign behavior. Information that has been recorded across other different systems outside of an organization's can provide insight regarding if the analysis/data of alert details varies from the norm above (per crowd sourcing), which be an added factor that makes up the final score.

As another example, an SOC team might have 5 tickets generated from the EDR solution in the past 7 days and has closed 1 as TP and 4 as FP. FIG. 7 depicts a table of example resolved security incident tickets to which the illustrative embodiments can be applied. As the tickets are closed the ingestion pipeline begins and triggers the source through the pre-processing steps.

After the previous steps have been completed, the tokenization of the field values are processed. In all 5 tickets the same detection name 'Suspicious executable spawned from Powershell' is observed. Among the tokens generated, the system determines that the score is high for both the Host-Name and the FileName.

The list of HostNames is fed into the regular expression generator. The output comprises various levels of suggestion based on the slider (see FIG. 4), which helps establish exclusions to the alert detection rule. Once a suggested slider option is selected, the proposal is compared to the rest of the dataset to find the total TP/FP rate. The same process is repeated for the FileName.

If the Hostname slider is very tight, it will only exclude four of the HostNames from alert generation. An alert will be generated for any other system, even if the same File-Name is observed. Such a setting is useful when the risk is not acceptable, and alerts should be investigated whenever observed. However, it has the disadvantage of generating additional FPs from the HostName that contain similar naming patterns, thereby creating additional workload for the SOC personnel.

If the HostName slider is set more loosely, it will allow similar HostNames to be excluded from alert generation. This has the benefit of generating less FPs for SOC personnel to investigate. However, it has the disadvantage of not generating alerts for similar HostNames and FileNames, thereby preventing SOC awareness to investigate.

The final tuning proposals are presented to the user. The user takes the final proposed solution and implements it, preventing future 'Suspicious executable spawned from Powershell' alerts matching the final proposed criteria.

FIG. 8 depicts a flowchart illustrating a process for reducing false positive computer security alerts in accordance with an illustrative embodiment. Process 800 can be implemented in alert filter system 180 in FIG. 1.

Process 800 begins by ingesting a first dataset comprising a number of security alerts with resolution status, wherein the security alerts each comprise a number of data fields (step 802). The first dataset may comprise an integrated dataset derived from multiple data sources. These data sources may include Security Information and Event Management (SIEM), Endpoint Detection and Response (EDR), Web Application Firewall (WAF); Managed Detection and Response (MDR), and IT Service Management (ITSM).

The data field within the security alerts are then tokenized (step 804). Tokenizing may be performed using at least one of non-alphanumeric characters, new line, return carriages, or separators in key/value pairs as delimiters.

Cardinality is calculated for each tokenized data field compared against the whole first dataset (step 806), as well as entropy for each tokenized data field's values (step 808). A combined token score for each tokenized data field is then generated based on the cardinality and entropy (step 810).

Each combined token score is compared against all tokenized data fields for the security alerts in the first dataset (step 812) and adjusted based on the comparison (step 814). Any tokens that are present in security alerts resolved as true positives are excluded (step 816).

A generative language model generates a suggested exclusion condition based on the adjusted token scores (step 818), which is run against a second dataset to generate an exclusion condition score (step 820). The suggested exclusion condition and exclusion condition score are presented to a user for approval (step 822). Responsive to acceptance by the user, the suggested exclusion condition is deployed to filter false positive security alerts (step 824). Process 800 then ends.

Figure 9:
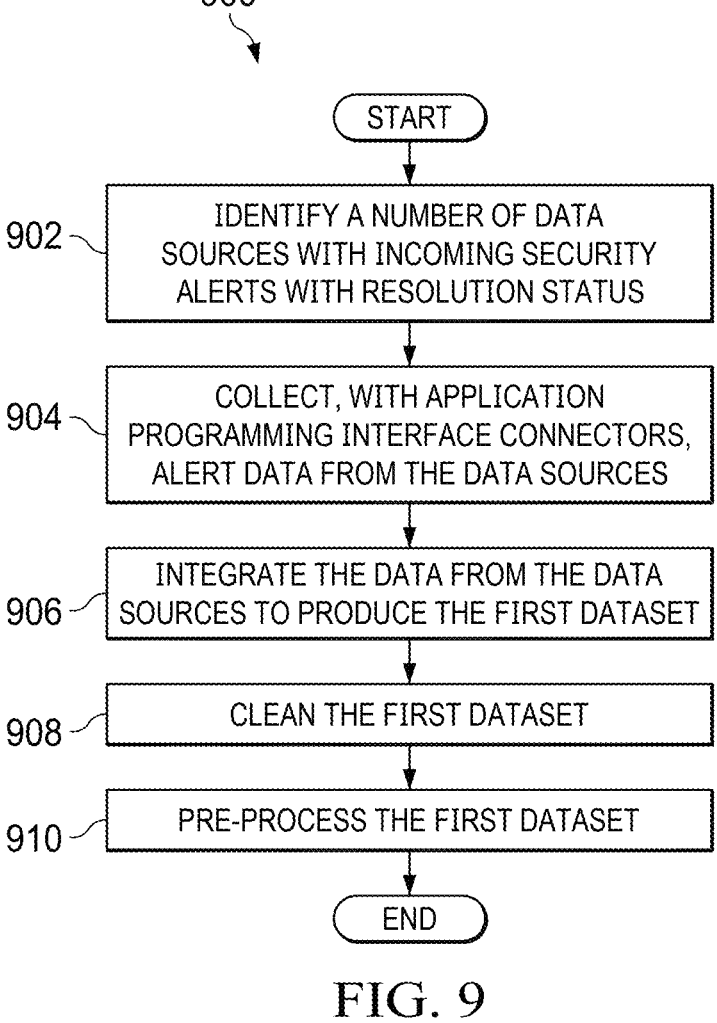
FIG. 9 depicts a flowchart illustrating a process for data ingestion in accordance with an illustrative embodiment.

FIG. 9 depicts a flowchart illustrating a process for data ingestion in accordance with an illustrative embodiment. Process 900 is a detailed example of step 802 in FIG. 8.

Process 900 begins by identifying a number of data sources with incoming security alerts with resolution status (step 902). Process 900 then uses application programming interface connectors to collect alert data from the data sources (step 904).

The data from the data sources is integrated to produce a single dataset (step 906). The first dataset is then cleaned (step 908) and pre-processed (step 910). Process 900 then ends.

Figure 10:
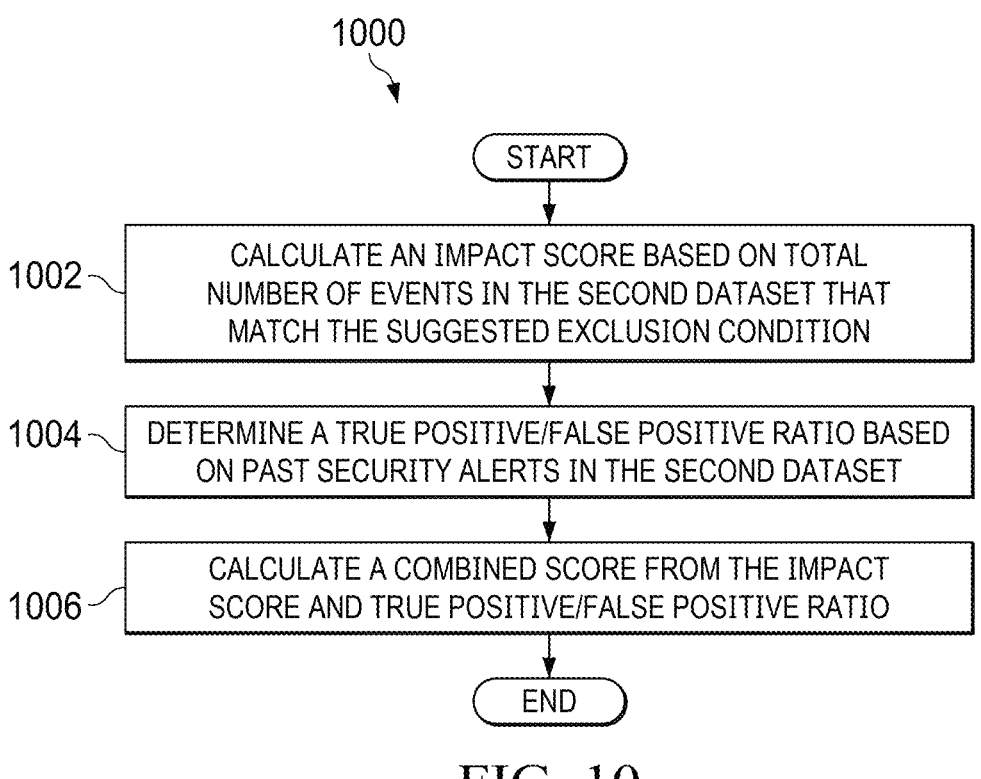
FIG. 10 depicts a flowchart for generating the exclusion condition score in accordance with an illustrative embodiment.

FIG. 10 depicts a flowchart for generating the exclusion condition score in accordance with an illustrative embodiment. Process 1000 is a detailed example of step 820 in FIG. 8.

Process 1000 begins by calculating an impact score based on total number of events in the second dataset that match the suggested exclusion condition (step 1002). A true positive/false positive (TP/FP) ratio is determined based on past security alerts in the second dataset (step 1004). A combined score is then calculated from the impact score and true positive/false positive ratio (step 1006). Process 1000 then ends.

As used herein, "a number of" when used with reference to items, means one or more items. For example, "a number of parameters" is one or more parameters. As another example, "a number of operations" is one or more operations.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combination of these items can be present. In some illustrative examples, "at least one of" can be, for example, without limitation, two of item A; one of item B; and ten of item C; four of item B and seven of item C; or other suitable combinations.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer-implemented method of reducing false positive computer security alerts, the method comprising:

ingesting a first dataset comprising a number of security alerts with resolution status, wherein the security alerts each comprise a number of data fields;

tokenizing the data field within the security alerts;

calculating cardinality for each tokenized data field compared against the whole first dataset;

calculating entropy for each tokenized data field's values;

generating a combined token score for each tokenized data field based on the cardinality and entropy;

comparing each combined token score against all tokenized data fields for the security alerts in the first dataset;

adjusting each combined token score based on the comparison;

excluding any tokens that are present in security alerts resolved as true positives;

generating, by a generative language model, a suggested exclusion condition based on the adjusted token scores;

running the suggested exclusion condition against a second dataset to generate an exclusion condition score;

presenting the suggested exclusion condition and exclusion condition score to a user; and responsive to acceptance by the user, deploying the suggested exclusion condition to filter false positive security alerts.

2. The method of claim 1, wherein ingesting the first dataset further comprises:

identifying a number of data sources with incoming security alerts with resolution status;

collecting, with application programming interface connectors, alert data from the data sources;

integrating the data from the data sources to produce the first dataset;

cleaning the first dataset; and pre-processing the first dataset.

3. The method of claim 2, wherein the data sources comprise at least one of:

Security Information and Event Management;

Endpoint Detection and Response;

Web Application Firewall;

Managed Detection and Response; or

IT Service Management.

4. The method of claim 2, wherein integrating the data from the data sources further comprises filtering the data to extract only data from needed fields.

5. The method of claim 1, wherein tokenizing is performed using at least one of the following as delimiters:

non-alphanumeric characters;

new line;

return carriages; or separators in key/value pairs.

6. The method of claim 1, wherein the generative language model generates the suggested exclusion condition within adjustable constraints provided through a user interface that has separate, respective slider controls for length and complexity of the exclusion condition.

7. The method of claim 1, generating the exclusion condition score further comprises:

calculating an impact score based on total number of events in the second dataset that match the suggested exclusion condition;

determining a true positive/false positive ratio based on past security alerts in the second dataset; and calculating a combined score from the impact score and true positive/false positive ratio.

8. The method of claim 1, wherein the second dataset used to generate the exclusion condition score includes crowd sourced data for security operations.

9. A computer system for reducing false positive computer security alerts, comprising:

one or more computer processors;

one or more computer readable storage devices; and computer program instructions, the computer program instructions being stored on the one or more computer readable storage devices for execution by the one or more computer processors to perform one or more operations to:

ingest a first dataset comprising a number of security alerts with resolution status, wherein the security alerts each comprise a number of data fields;

tokenize the data field within the security alerts;

calculate cardinality for each tokenized data field compared against the whole first dataset;

calculate entropy for each tokenized data field's values;

generate a combined token score for each tokenized data field based on the cardinality and entropy;

compare each combined token score against all tokenized data fields for the security alerts in the first dataset;

adjust each combined token score based on the comparison;

exclude any tokens that are present in security alerts resolved as true positives;

generate, by a generative language model, a suggested exclusion condition based on the adjusted token scores;

run the suggested exclusion condition against a second dataset to generate an exclusion condition score;

present the suggested exclusion condition and exclusion condition score to a user; and responsive to acceptance by the user, deploy the suggested exclusion condition to filter false positive security alerts.

10. The system of claim 9, wherein the program instructions that cause the system to ingest the first dataset further cause the system to:

identify a number of data sources with incoming security alerts with resolution status;

collect, with application programming interface connectors, alert data from the data sources;

integrate the data from the data sources to produce the first dataset;

clean the first dataset; and pre-process the first dataset.

11. The system of claim 10, wherein the data sources comprise at least one of:

Security Information and Event Management;

Endpoint Detection and Response;

Web Application Firewall;

Managed Detection and Response; or

IT Service Management.

12. The system of claim 10, wherein the program instructions that cause the system to integrate the data from the data sources further cause the system to filter the data to extract only data from needed fields.

13. The system of claim 9, wherein tokenizing is performed using at least one of the following as delimiters:

non-alphanumeric characters;

new line;

return carriages; or separators in key/value pairs.

14. The system of claim 9, wherein the generative language model generates the suggested exclusion condition within adjustable constraints provided through a user interface that has separate, respective slider controls for length and complexity of the exclusion condition.

15. The system of claim 9, wherein the program instructions that cause the system to generate the exclusion condition score further cause the system to:

calculate an impact score based on total number of events in the second dataset that match the suggested exclusion condition;

determine a true positive/false positive ratio based on past security alerts in the second dataset; and calculate a combined score from the impact score and true positive/false positive ratio.

16. The system of claim 9, wherein the second dataset used to generate the exclusion condition score includes crowd sourced data for security operations.

17. A computer program product for reducing false positive computer security alerts, the computer program product comprising:

a persistent storage medium having program instructions configured to cause one or more processors to:

ingest a first dataset comprising a number of security alerts with resolution status, wherein the security alerts each comprise a number of data fields;

tokenize the data field within the security alerts;

calculate cardinality for each tokenized data field compared against the whole first dataset;

calculate entropy for each tokenized data field's values;

generate a combined token score for each tokenized data field based on the cardinality and entropy;

compare each combined token score against all tokenized data fields for the security alerts in the first dataset;

adjust each combined token score based on the comparison;

exclude any tokens that are present in security alerts resolved as true positives;

generate, by a generative language model, a suggested exclusion condition based on the adjusted token scores;

run the suggested exclusion condition against a second dataset to generate an exclusion condition score;

present the suggested exclusion condition and exclusion condition score to a user; and responsive to acceptance by the user, deploy the suggested exclusion condition to filter false positive security alerts.

18. The computer program product of claim 17, wherein the instructions to ingest the first dataset further comprise instructions to:

identify a number of data sources with incoming security alerts with resolution status;

collect, with application programming interface connectors, alert data from the data sources;

integrate the data from the data sources to produce the first dataset;

clean the first dataset; and pre-process the first dataset.

19. The computer program product of claim 17, wherein the generative language model generates the suggested exclusion condition within adjustable constraints provided through a user interface that has separate, respective slider controls for length and complexity of the exclusion condition.

20. The computer program product of claim 17, the instructions to generate the exclusion condition score further comprise instructions to:

calculate an impact score based on total number of events in the second dataset that match the suggested exclusion condition;

determine a true positive/false positive ratio based on past security alerts in the second dataset; and calculate a combined score from the impact score and true positive/false positive ratio.

\* \* \* \* \*